(12) United States Patent
Gottschalk et al.

(10) Patent No.: US 6,293,570 B1
(45) Date of Patent: Sep. 25, 2001

(54) SELF-STEERING, CASTER-ADJUSTABLE SUSPENSION SYSTEM

(75) Inventors: Michael J. Gottschalk, Granville; Kevin M. Jablonski, Blacklick, both of OH (US)

(73) Assignee: The Boler Company., Itasca, IL (US)

( * ) Notice: Subject to any disclaimer, the term of this patent is extended or adjusted under 35 U.S.C. 154(b) by 0 days.

(21) Appl. No.: 09/593,516

(22) Filed: Jun. 15, 2000

(51) Int. Cl.[7] .................................................. B62D 17/00
(52) U.S. Cl. ................................... 280/86.751; 280/86.5; 280/86.6
(58) Field of Search ........................... 280/86.751, 86.5, 280/81.6, 89.11, 86.6

(56) References Cited

U.S. PATENT DOCUMENTS

| | | |
|---|---|---|
| 3,510,149 | 5/1970 | Raidel . |
| 3,771,812 | 11/1973 | Pierce et al. . |
| 3,861,708 | 1/1975 | Fier . |
| 3,902,734 | 9/1975 | Fier . |
| 3,904,220 | 9/1975 | Fier . |
| 4,770,430 | 9/1988 | Lange . |
| 4,792,148 | 12/1988 | Hintz . |
| 4,881,747 | 11/1989 | Raidel . |
| 5,015,004 | 5/1991 | Mitchell . |
| 5,018,756 | 5/1991 | Mitchell . |
| 5,058,916 | 10/1991 | Hicks . |
| 5,220,972 | 6/1993 | Proia . |
| 5,403,031 | 4/1995 | Gottschalk et al. . |
| 5,479,999 | 1/1996 | Proia . |
| 5,620,194 | 4/1997 | Keeler et al. . |
| 5,816,605 | 10/1998 | Raidel, Sr. . |
| 6,007,078 | 12/1999 | Gottschalk et al. . |
| 6,182,984 | * 2/2001 | Chalin ............................. 280/86.751 |

OTHER PUBLICATIONS

Ridewell Corp. "Auto–Reversing Kit/Short", Drawing No. AS–7570C #4, May 14, 1991.

* cited by examiner

Primary Examiner—Paul N. Dickson
Assistant Examiner—Faye M. Fleming
(74) Attorney, Agent, or Firm—Hall, Priddy, Myers & Vande Sande

(57) ABSTRACT

An improved steerable axle suspension system for vehicles, providing improved mechanisms whereby the caster angle of a wheeled axle may be adjusted to allow for steerability in either the forward or reverse direction of travel.

19 Claims, 12 Drawing Sheets

SELF-STEERING, CASTER-ADJUSTABLE SUSPENSION SYSTEM

FIELD OF THE INVENTION

This invention relates to axle suspension systems for vehicles. More particularly, this invention relates to improved mechanisms for adjusting the caster angle of the axle of such a suspension system to allow for steerability in either the reverse or forward travel mode.

BACKGROUND OF THE INVENTION

The need for steerable auxiliary axles on various types of vehicles (trucks, trailers, etc.) is well known. By the term "auxiliary" axle, as used herein, is meant an axle which is not the axle primarily used for steering the vehicle. Instead, an "auxiliary" axle is one usually added to the vehicle so as to be either forward or rearward of the primary axles and rearward of the vehicle's primary steering axle (e.g. in a straight truck such as a dump truck, garbage truck, etc.). The purpose of adding such an auxiliary axle to the vehicle is normally to increase the load carrying capacity of the vehicle and/or to satisfy highway weight limit laws. Such auxiliary axles may be of the non-liftable or liftable type as contemplated herein.

To render a wheeled axle bearing suspension system "steerable", the caster angle (from the vertical) of the axle (or as may be used at times synonymously in the art, the caster angle of the wheels) must be appropriately chosen to make the wheels of the suspension steerable. A recognized, but not necessarily required, caster angle (from the vertical) is from about 3° to 5°. Thus a 5° caster angle, for example, may be employed for steerable forward travel, while for reverse travel the caster must then be changed, for example, to a –3° caster angle from the vertical. In short, a caster angle for steerability in one travel mode does not normally render steerable the wheel in the opposite travel mode. A need thus arises in the art to provide a mechanism for adjusting (changing) the caster angle, thereby to allow the axle (e.g. auxiliary steerable axle) to be steered during either the reverse or forward mode of travel.

One known and rather successful system has been developed to provide an adjustable mechanism whereby the vehicle (e.g. heavy duty truck or semitrailer) operator can change the caster angle of his auxiliary axle. This mechanism is illustrated in U.S. Pat. No. 6,007,078 and constitutes a principal background from which this invention arose. As to certain embodiments of this invention, they may be considered specific improvements upon this aforesaid patent in that there is herein provided a unique mechanism for adjusting the caster angle of a wheeled axle which may be used instead of the caster angle adjustment disclosed in this prior patent. The same basic parallelogram structure, however, is otherwise maintained so as to couple its unique efficacy with that of this invention. For this reason, the entire disclosure of U.S. Pat. No. 6,007,078 is herein incorporated by reference.

Generally speaking, in order to achieve the desired forward and rearward steerability in the now known parallelogram suspension system disclosed in the '078 patent, there is employed a pair of opposing air brake chambers each including an extendible and retractable rod. In this prior art system, one end of each rod is connected to a cradle which is further connected at a pivot to a hanger bracket which, in turn, is secured to the frame of the vehicle. In addition, two arms connect the cradle to an axle seat (retaining a wheeled axle) thereby forming the basic parallelogram structure. Each respective arm is connected to both the cradle and the axle seat by pivots. Thus, when one of the opposing air brake chambers is pressurized, and the opposite chamber is simultaneously exhausted of air, the reciprocating rods extend or retract in respective fashion, thereby causing the cradle to pivot with respect to the hanger bracket. As the cradle pivots with respect to the hanger bracket, the axle seat is simultaneously pivoted (via the two arms), thereby changing the caster angle of the wheeled axle.

Although the aforesaid system is both successful and effective, it is desirable in the art to achieve a steerable suspension system of decreased complexity and reduced size which may be produced and maintained at a more attractive cost. In particular, it is desirable to achieve a suspension system which maintains steerability while eliminating unnecessary external mechanical forces.

It is a purpose of this invention to fulfill this and other needs which will become more apparent to the skilled artisan once given the following disclosure.

SUMMARY OF THE INVENTION

Generally speaking, this invention fulfills the above-described needs in the art by providing: in a steerable axle suspension system for a wheeled vehicle having a frame member, the suspension system including a wheel bearing axle having a generally vertical centerline and at least one ground engaging wheel at each end thereof, the suspension system being attachable to the frame member and when so attached defining a caster angle for the axle with respect to the travel surface of the vehicle, the suspension system further including a hanger bracket for connecting the suspension system to the frame member, an axle seat for retaining the axle in the system, a first and a second beam member extending between the axle seat and the hanger bracket, and a mechanism for adjusting the caster angle of the axle;

wherein the improvement comprises as the mechanism for adjusting the caster angle of the axle:

a pivot assembly pivotally attached to the hanger bracket;

a first pivot attached to the pivot assembly and having an end of the first beam member attached thereto, the other end of the first beam member being pivotally attached to the axle seat;

a second pivot attached to the pivot assembly and having an end of the second beam member attached thereto, the other end of the second beam member being pivotally attached to the axle seat;

a third pivot attached to the pivot assembly and to the hanger bracket such that the pivot assembly is pivotable with respect to the hanger bracket about the third pivot;

wherein the first, second and third pivots are so located one with respect to the other such that when the pivot assembly is pivoted about the third pivot with respect to the hanger bracket, the caster angle of the axle is changed; and wherein the mechanism for adjusting the caster angle of the axle further includes a mechanism for pivoting the pivot assembly about the third pivot comprising:

an air bellows so located with respect to the centerline of the axle such that when the air bellows is expanded or contracted the pivot assembly is pivoted about the third pivot thereby to change the caster angle to a desired angle; and wherein the air bellows is of a sufficient capacity and is sufficiently offset from the centerline of the axle such that, when inflated, the air bellows maintains the angle of caster at the desired angle during vehicle travel.

This invention will now be described with respect to certain embodiments thereof as illustrated in the following drawings wherein:

IN THE DRAWINGS

DETAILED DESCRIPTION OF CERTAIN EMBODIMENTS

This invention constitutes an improvement upon the suspension system disclosed in commonly owned U.S. Pat. No. 6,007,078. entitled SELF-STEERING, CASTER ADJUSTABLE SUSPENSION SYSTEM.

Figure 1A:
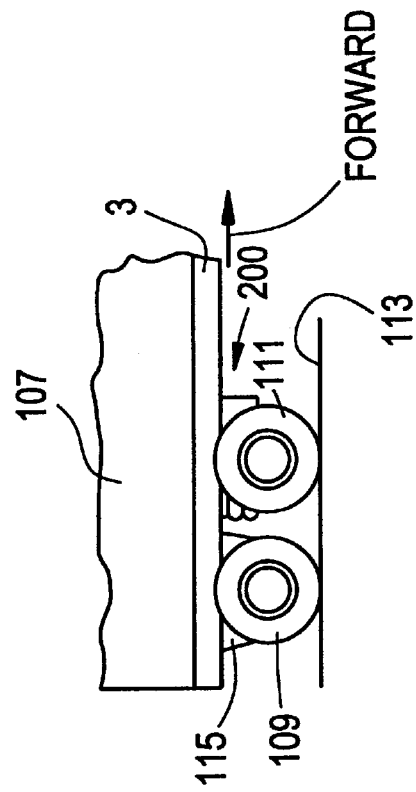
FIG. 1A is a side-plan, partial illustration of a vehicle employing an embodiment of a wheeled axle suspension system according to this invention shown in the lifted mode as an auxiliary axle forward of the rearmost axle of the vehicle.
Figure 1B:
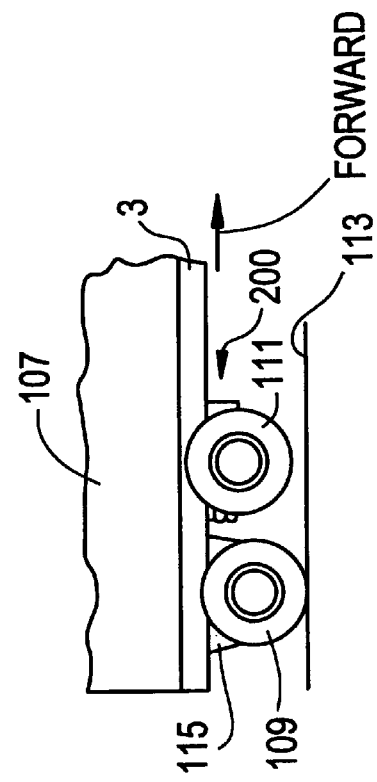
FIG. 1B is the illustration as shown in FIG. 1A with the suspension shown in its road-engaging mode.

With reference initially to FIGS. 1A, 1B, there is illustrated an environment in which the steerable suspension systems of this invention find utility. Therein is illustrated, in partial view, a typical truck (e.g. dump truck, etc.) or semi-trailer body 107 having a longitudinal frame member 3 on either side of body 107 (only one side of the vehicle and frame member being shown, the other side being, of course, a duplicate of the side shown).

Rearmost wheels 109 form a primary means of vehicle support via its standard suspension 115 connected to frame members 3 in conventional fashion. Immediately forward of wheels 109 are wheels 111 which are selectively raisable and lowerable from and into engagement with travel surface 113 of the vehicle by employing an embodiment of a suspension system 200 as contemplated by this invention. Such a suspension system 200 is often referred to as an auxiliary lift axle suspension system.

Figure 2A:
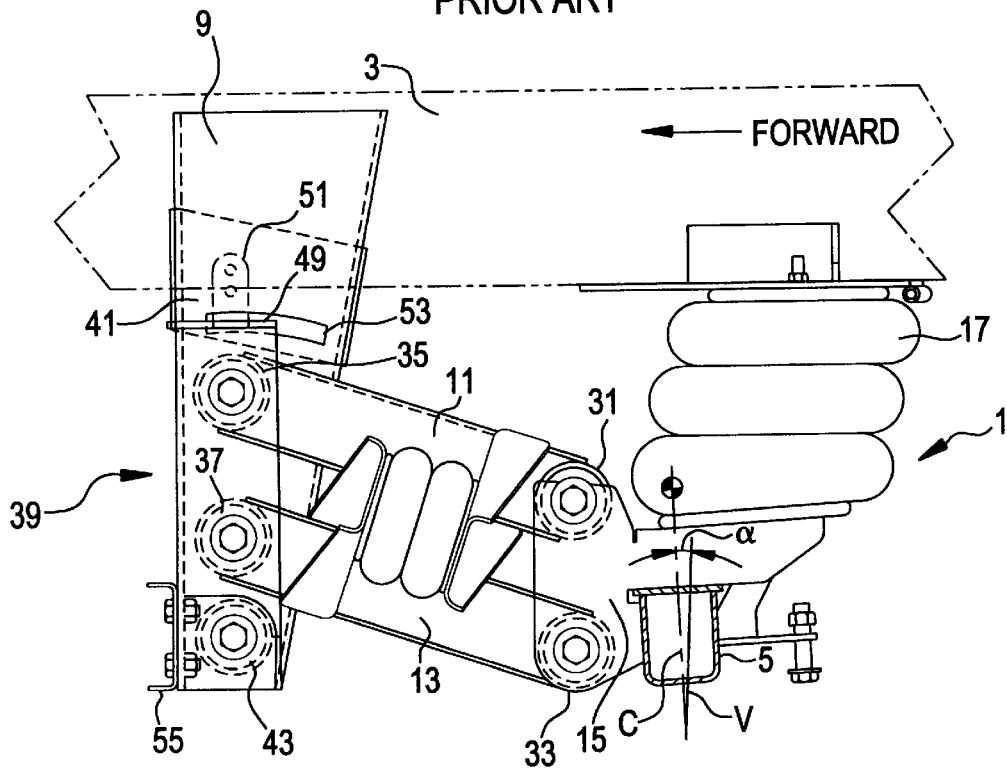
FIG. 2A is a partial, side-plan view of an embodiment of the prior art suspension system shown with the axle caster in a reverse travel mode.
Figure 2B:
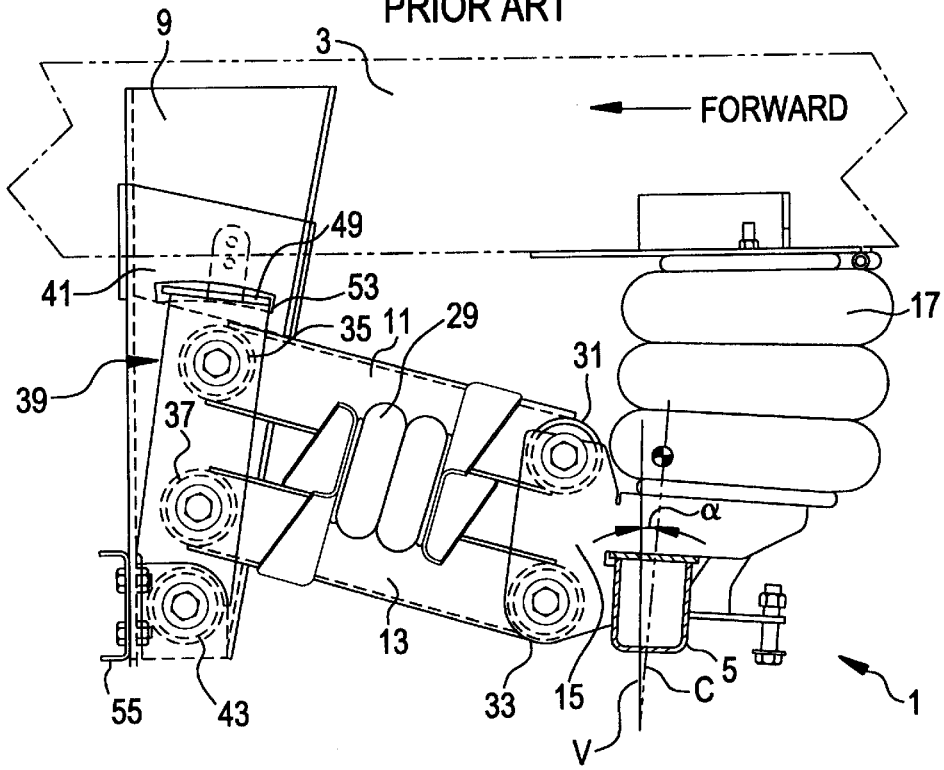
FIG. 2B is the same embodiment of the prior art suspension system as in FIG. 2A but with the axle caster in a forward travel mode.
Figure 3:
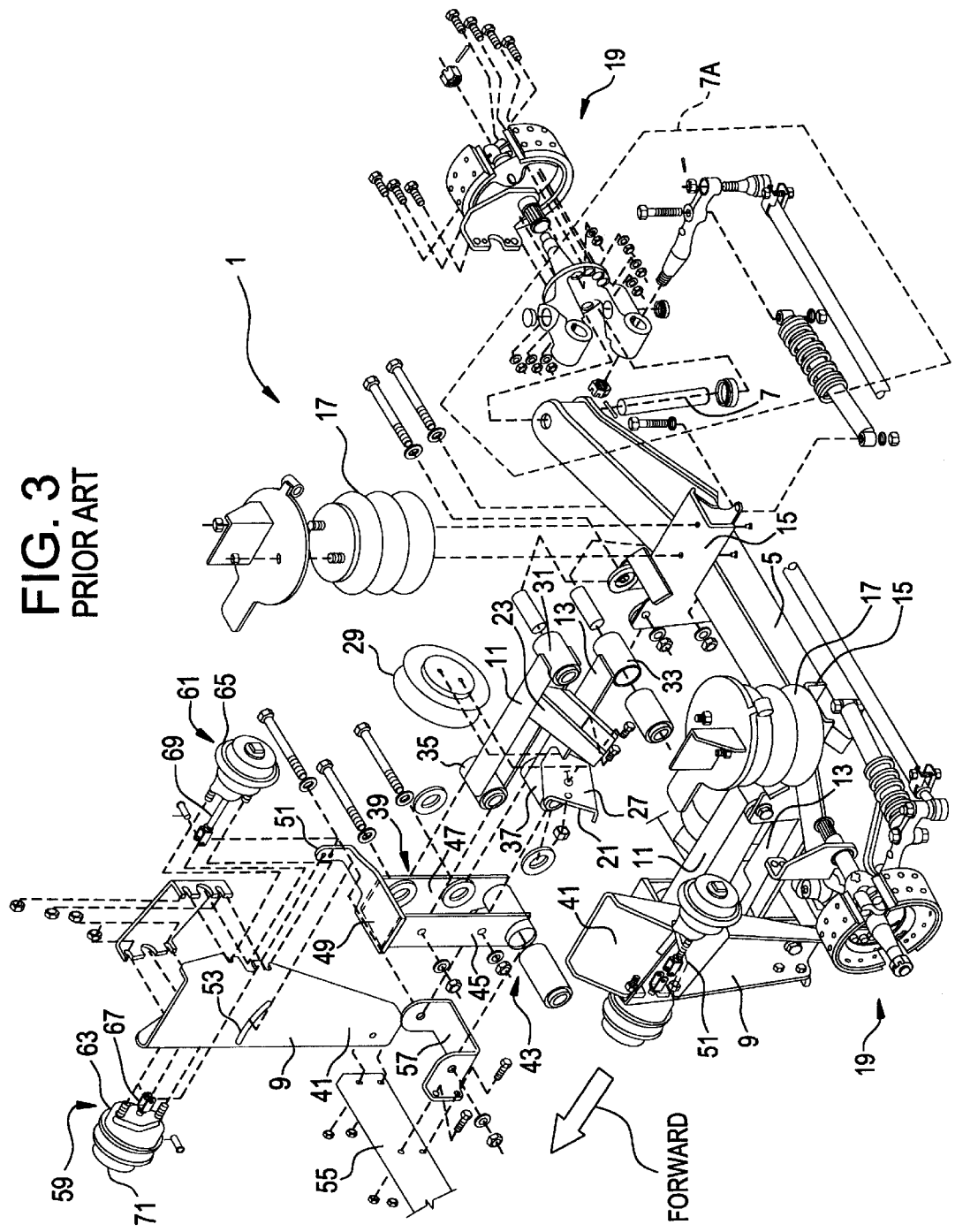
FIG. 3 is a three-dimensional, exploded view of the prior art suspension system illustrated in FIGS. 2A and 2B.

Turning now to FIGS. 2A, 2B, there is illustrated an embodiment of the prior art suspension system 1 in its reverse caster travel mode (FIG. 2A) and forward caster travel mode (FIG. 2B). In this respect, "forward" travel of the vehicle is indicated with an appropriate arrow "Forward" (see also FIG. 3). The opposite direction is, of course, the "reverse" direction of vehicle travel. The caster angle α of axle 5 is the angle formed between the vertical "V" and the center line "C" of axle 5. Conventionally, but not necessarily, the center line of kingpin 7 (as illustrated in FIG. 3) is parallel to center line C. In short, as illustrated, to render auxiliary wheels steerable, in most instances, the caster angle is formed, i.e. axle 5 is "tilted", so that the bottom of kingpin 7 "leads" its top corresponding counterpart in the direction of travel. Various angles, positive and negative, may be employed depending upon the vehicle, the type of operation, axle location, etc., and as such are well known to the skilled artisan for his selection. For most purposes contemplated an angle α of about 3° to 5° (forward/reverse) from vertical is usually acceptable, and indeed often optimal. In this respect, the reverse angle need not be, and often is not, the same as the forward angle for a particular vehicle.

As illustrated, and still referring to FIGS. 2A and 2B, prior art caster adjustable suspension 1 includes on each side of the vehicle associated with a respective longitudinal frame member 3, a hanger bracket 9, an upper longitudinal beam member (i.e. control arm) 11, a lower longitudinal beam member (i.e. control arm) 13, an axle seat generally represented at 15 and air bellows 17. Axle 5, of course, extends laterally across the vehicle and includes at either end a conventional wheel assembly with brake pads, etc. as illustrated generally at 19 (FIG. 3). Axle 5, via its connection axle seat 15, connects the two sides of suspension system 1 as does "C"-shaped cross-member 55.

Also extending laterally across the vehicle and coordinating the steerability of each wheel 111, are various conventional interrelated members, illustrated in FIG. 3, all connected in a known fashion to render the axle suspension system 1 steerable through a series of interconnected pins and rods. For convenience this kingpin steerable assembly, being conventional, is indicated generally in the framed in area as item "7A". Such assemblies are well known in the art and their various illustrated parts need not be further detailed here.

Maintaining the parallelogram nature of prior art system 1 are four pivots of conventional type (elastomeric bushing pivots), as shown in FIGS. 2A and 2B, connecting each end of beams 11 and 13 to cradle 39 and axle seat 15, respectively. Pivots 31 and 33 are the axle seat pivots, while pivots 35 and 37 are the cradle pivots. Preferably the distance between pivots 31 and 33 is the same as the distance between pivots 35 and 37, thereby to maintain the true parallelogram nature of the suspension.

Air bellows 17 are connected at their top end to their respective frame members 3 and at their bottom end to axle seat 15 in conventional fashion. In this way, and in a now known manner, air bellows 17 are the primary means for taking up (i.e. handling) the articulation and load-carrying forces of the suspension (and thus the vehicle) experienced during vehicle operation over the road surface.

The known mechanism for adjusting the caster of the prior art system, as illustrated herein, includes, with respect to each side of the vehicle (and hanger bracket 9), a cradle 39 pivotally connected to vertical side plate 41 of hanger bracket 9 by pivot 43. Pivot 43 is of the same type as pivots 35 and 37, and allows cradle 39 to be pivoted with respect to stationary hanger bracket 9. As can be seen, cradle 39 includes a pair of opposing vertical side plates 45, 47 (FIG. 3). Pivots 35 and 37 extend between plates 45 and 47 (as illustrated in FIG. 3) and are pivotally connected thereto rather than to hanger bracket plate 41. Cradle 39 then further includes a top flange 49 (FIGS. 2A, 2B, and 3) extending across and connecting plates 45 and 47, but having an arm 51 extending outwardly therefrom and through a guide slot 53 in plate 41 of hanger bracket 9. Bottom plate 57 may be provided to strengthen the assembly, but, as illustrated, must not interfere with the ability of cradle 39 to be pivoted about pivot 43 with respect to hanger bracket 9.

As can now be seen in FIGS. 2A and 2B, and as described more fully below, if cradle 39 is pivoted about pivot 43 in either direction, the parallelogram pivots 35 and 37 also simultaneously move with respect to pivot 43. Since pivots 31 and 33 are connected to axle seat 15, to which axle 5 is connected, the caster angle $\alpha$ of axle 5 (and thus the steerability of wheels 111) is changed in this embodiment by movement of arm 51, while the essential benefits of a parallelogram suspension are maintained. As illustrated in FIG. 2A, by moving arm 51 in the forward direction proximal one end of slot 53, a negative caster angle $\alpha$ of $-5°$ or, in certain embodiments, $-3°$ is achieved in axle 5 for reverse steerable travel. In FIG. 2B arm 51 is moved rearward proximal the opposite end of slot 53, thus achieving a positive caster angle $\alpha$ of $5°$ in axle 5 for forward steerable travel. The angles of caster, size of slot 53, etc. may be chosen and varied as the application dictates and need not be $3°$ or $5°$, which are simply preferred representative angles $\alpha$ found useful in many trucking environments both on and off road.

Figure 4A:
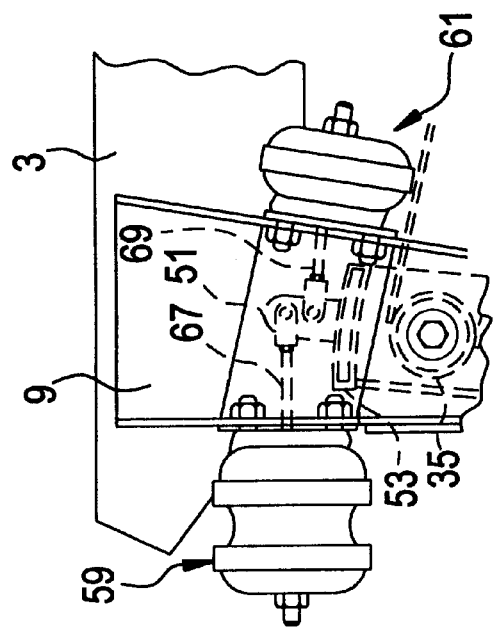
FIGS. 4A and 4B are partial, side-plan, x-ray views of one embodiment of a prior art mechanism for effecting the change of the caster angle.
Figure 4B:
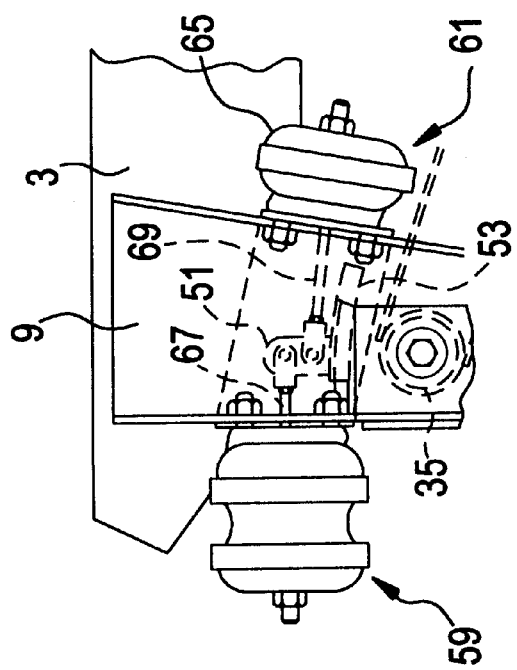
Figure 5:
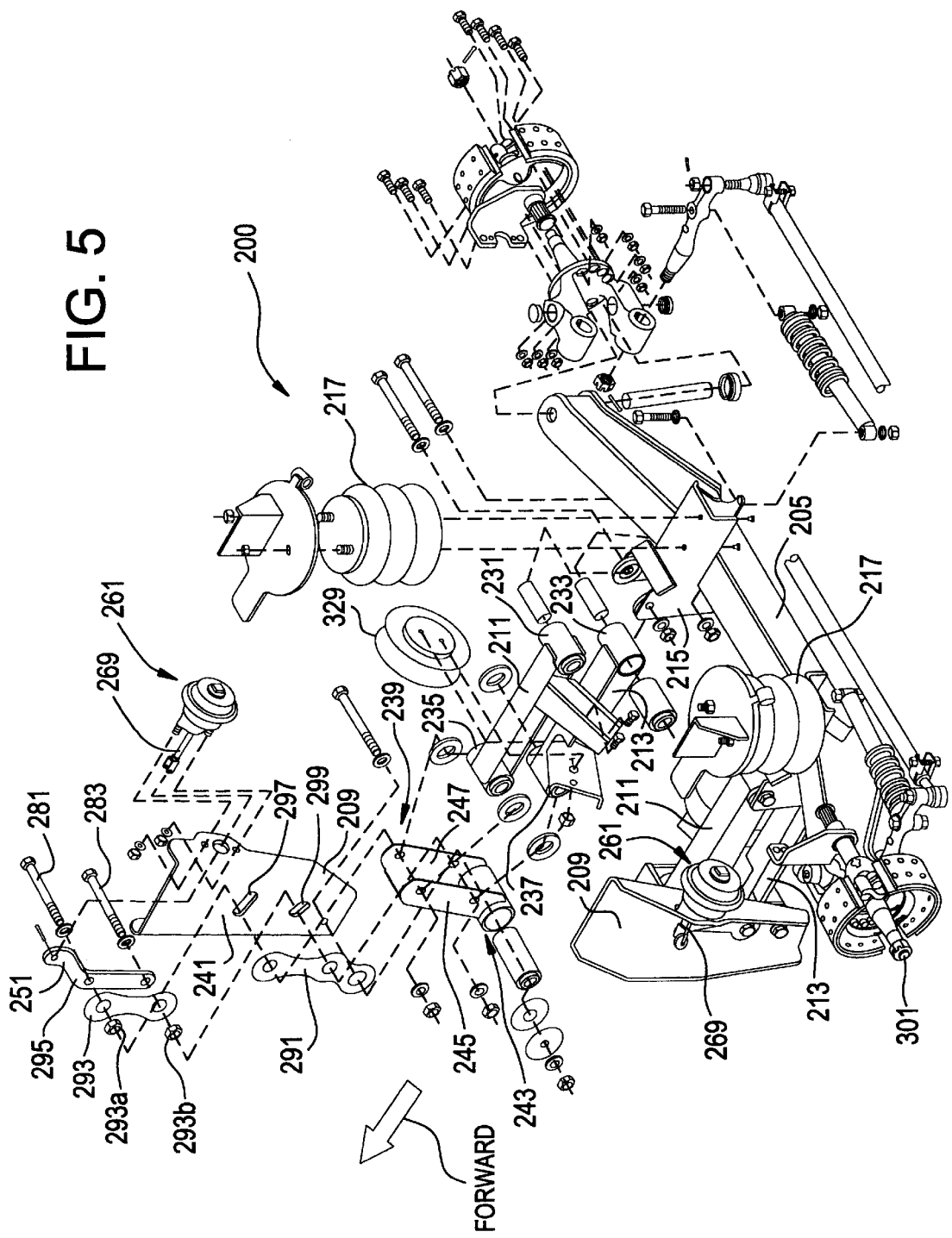
FIG. 5 is a three-dimensional, exploded view of an embodiment of the improved caster adjustable suspension system of this invention.
Figure 6:
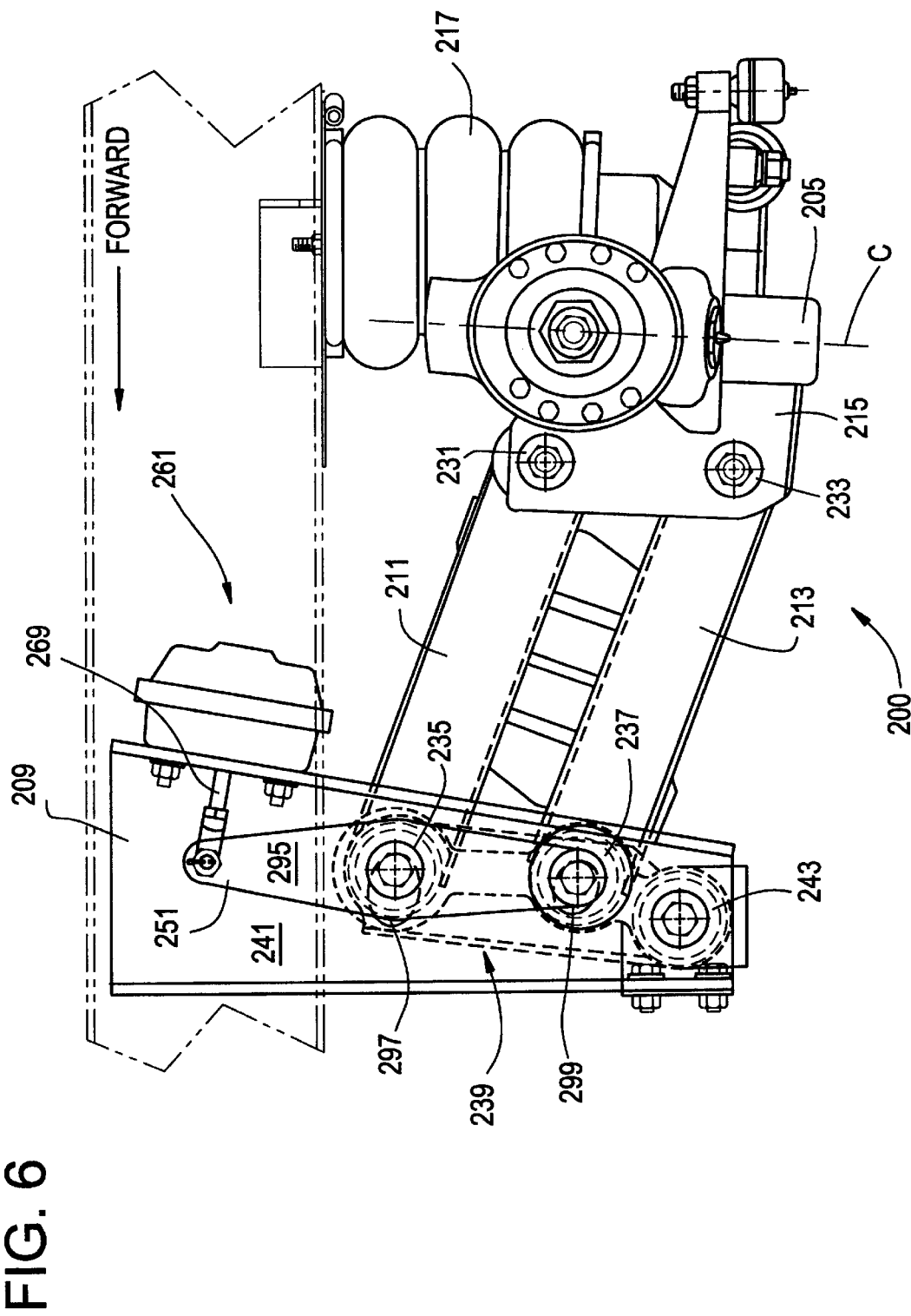
FIG. 6 is a partial, side-plan view of the embodiment illustrated in FIG. 5.

Attention is now directed to FIGS. 4A and 4B in order to describe the rather successful prior art mechanism heretofore used to pivot cradle 39 to adjust caster angle and achieve steerability. This will then serve as a background against which the improvement of this invention can be more readily appreciated.

In this prior art system, respective opposing air brake chamber assemblies 59 and 61 are provided and include reciprocal rods 67 and 69 respectively. These chambers 59 and 61 are of known type (e.g. 24" MGM air brake chambers) and are employed to provide two important functions ie. first initially achieving, and second, thereafter locking in (ie. maintaining during vehicle operation) the desired caster angle. In order to successfully perform these functions, either rod 67 or rod 69 is extended and the opposite rod (69 or 67) retracted to provide a full range of movement from a positive (forward steerable) caster angle $\alpha$ to a negative (rearward steerable) caster angle $\alpha$ and vice versa. This is done by pressurizing one air brake chamber assembly 59 or 61 and exhausting air from the opposing assembly. In addition, by using opposing chambers in this way (ie. pressurizing one and exhausting the other), the desired caster angle, once achieved, is effectively "locked" in place by one of these opposing assemblies 59 or 61 (ie. by the pressurized brake chamber). For example, and with reference to FIGS. 4A, 4B, it can be seen that when rod 67 is retracted and rod 69 extended, cradle 39 pivots about pivot 43 causing caster angle $\alpha$ to be in the "reverse" travel mode for steerability, while the opposite operation (FIG. 4B) causes caster angle $\alpha$ to assume its "forward" travel mode for steerability. In both modes, caster angle $\alpha$ must be "locked" in place by one of the respective opposing brake chambers. It is to be noted here that if only one assembly 59 or 61 is provided, both forward and reverse caster angle adjustment cannot be carried out. Although this prior art system 1 has been quite effective and successful in the industry, it would be advantageous to achieve a steerable-suspension system which costs less, weighs less, and saves packaging space.

Referencing now an embodiment of the invent-ion herein, there is presented suspension system 200, in FIGS. 5, 6, 7A, and 7B wherein the functions performed in the past are now more efficiently and effectively carried out. As illustrated, suspension system 200 generally includes the same basic parts/framework which prior art suspension 1 included. For example, suspension system 200, as an embodiment of this invention, includes the basic parallelogram structure of the prior art device of the '078 patent through the use of analogous arms 211 and 213, which are pivotally connected to both pivot assembly 239 and axle seat 215. Connecting each end of beams 211 and 213 to pivot assembly 239 and axle seat 215 are pivot assembly pivots 235 and 237 and axle seat pivots 231 and 233, respectively.

With respect to this invention, the "cradle" assembly of the '078 patent is now replaced by pivot assembly 239. Pivot assembly 239 includes a pair of opposing vertical side plates 245 and 247 which are pivotally attached to pivots 235 and 237 (which extend between them). Pivot assembly 239 is, of course, further pivotally connected (at pivot 243) to stationary hanger bracket 209 which, in turn, is fixedly connected to frame member 3. Also included as part of pivot assembly 239, and not included in the prior art system, are three additional vertically elongated side plates 291, 293, and 295. Plates 291 and 293 are wear plates which move with the system but which may or may not be attached (ie. clamped) to the pivot assembly. Plate 295 is attached to vertical side plate 247 via bolts 281 and 283 (of pivots 235 and 237) as well as spacers 293*a* and 293*b*. In this manner, pivot assembly 239 is attached to hanger bracket 209 (via pivot 243), such that hanger bracket plate 241 is disposed between vertical wear pads 291 and 293. In such an arrangement, guide slots 297 and 299 are then conveniently provided in plate 241 (of hanger bracket 209) to allow movement of bolts 281 and 283, within their respective slots (297,299), in order to permit pivot assembly 239 to pivot with respect to hanger bracket 209 and about pivot 243. Plate 295 further includes an offset arm 251 extending outwardly therefrom, provided for connecting pivot assembly 239 to air brake chamber assembly 261 (via its extendable/retractable rod 269) as in the invention of the aforesaid '078 patent. When pivot assembly 239 is caused to pivot with respect to hanger bracket 209, axle seat 215 (retaining axle 205), which is connected to pivot assembly 239 via parallel arms 211 and 213, is consequently shifted to a corresponding caster angle.

As stated above, the subject invention involves the use of a unique and more efficient mechanism by which a change (ie. adjustment) of caster angle may be achieved. To more fully understand this, attention is directed to FIGS. 6, 7A, and 7B. Therein a conventional air brake chamber 261 is provided for achieving, in this instance, a caster angle for a rearward roll together with air bellows 217 (represented by an arrow in FIGS. 7A and 7B) which is attached at one end to vehicle frame member 3 in a conventional manner. At its opposite end, air bellows 217 is further attached to axle seat 215, at a pre-selected and sufficient amount of offset (offset "O") with respect to centerline "C" of the axle 205, such that a second air brake chamber (such as air brake chamber assembly 59 of the prior art) is now not needed to achieve and lock-in a caster angle for a forward roll, such as was used in the prior art '078 suspension system. In this respect, it is understood that, as caster angle is changed, centerline "C" will not be perfectly vertical. However, centerline "C" remains in a generally vertical plane and is thus herein referred to as "generally vertical" in order to identify which centerline we are referring to.

As aforesaid, in the prior art '078 patent, air brake chamber assembly 59 is the primary means by which a caster angle for a forward roll may be achieved. Specifically, as illustrated in FIGS. 2B and 4B, when pressurized with air, air brake chamber assembly 59 extends rod 67 and shifts the axle 5 to a caster angle appropriate for a forward roll. In the present invention however, and as a substantial improvement over the aforesaid '078 prior art system, if air bellows 217 is connected to axle seat 215 at a sufficient, pre-selected offset distance, illustrated as "O", from centerline "C" of axle 205, air bellows 217, when inflated, produces a sufficient moment/force about pivot 243 such that a second air brake chamber (e.g. prior art assembly 59) is not needed. While the prior art device in the '078 patent and its commercial embodiment did, in fact, offset the airbag from centerline "C", the offset was insufficient to create the necessary locking force (an example of such a prior art offset being approximately 3.5 inches). Thus, the additional brake chamber mechanism was employed to achieve this essential "lock" of the caster when the vehicle was in operation.

In short, the basic inventive discovery by the inventors herein is that by using an adequate pre-selected offset "o", two advantageous results are synergistically achieved enabling the elimination of one of the brake chambers heretofore employed. First, air bellows 217 (one on each side of suspension system 200), when expanded, achieves a caster angle for a forward roll without need for assembly 59. Second, the force/moment produced by air bellows 217, when attached to axle seat 215 at an adequate offset distance "O" from centerline "C", is sufficient to lock in the forward caster angle (when brake chamber 261 is exhausted of air). More specifically, offsetting the point of attachment of air bellows 217 to axle seat 215, a distance "O" in a direction offset from centerline "C" of axle 205, effectively increases the moment/force produced about pivot 243 when air bellows 217 is inflated. Thus, if distance "O" is made large enough, the "locking" feature for that caster angle is achieved. This is because a longer lever arm is effectively created by increasing the distance (ie. offset distance "o") between pivot 243 (the fulcrum point) and the point of applied force of air bellows 217 as it is inflated against axle seat 215. Thus, the same size and type of air bellows 217 (pressurized to the same levels) may be used in the present system as in prior art system 1 (air bellows 17), while still achieving the benefits of the subject invention, but without the need for second air brake chamber. As a typical example, in the commercial embodiment of the '078 patent, the offset "O" was only about 3.5 inches, an amount insufficient, given the dimensions and arrangement of the parts of the prior art suspension system, to achieve an adequate "lock" of the desired cater angle. In contrast, in an analogously sized suspension of this invention, the offset "O" is typically at least 4 inches.

Figure 7A:
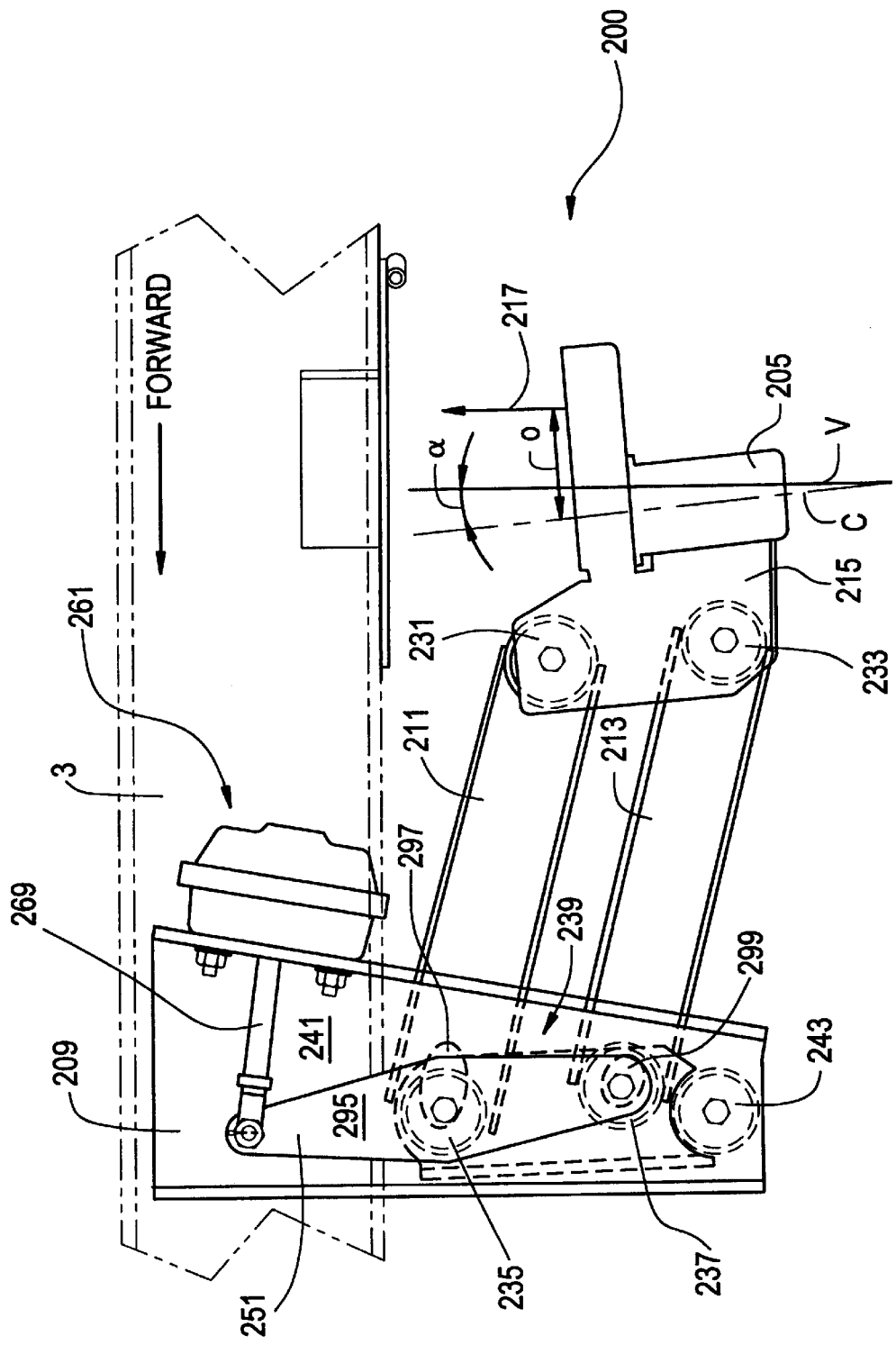
FIG. 7A is a partial, side plan view of the embodiment of FIG. 6 with the axle caster in a reverse travel mode.
Figure 7B:
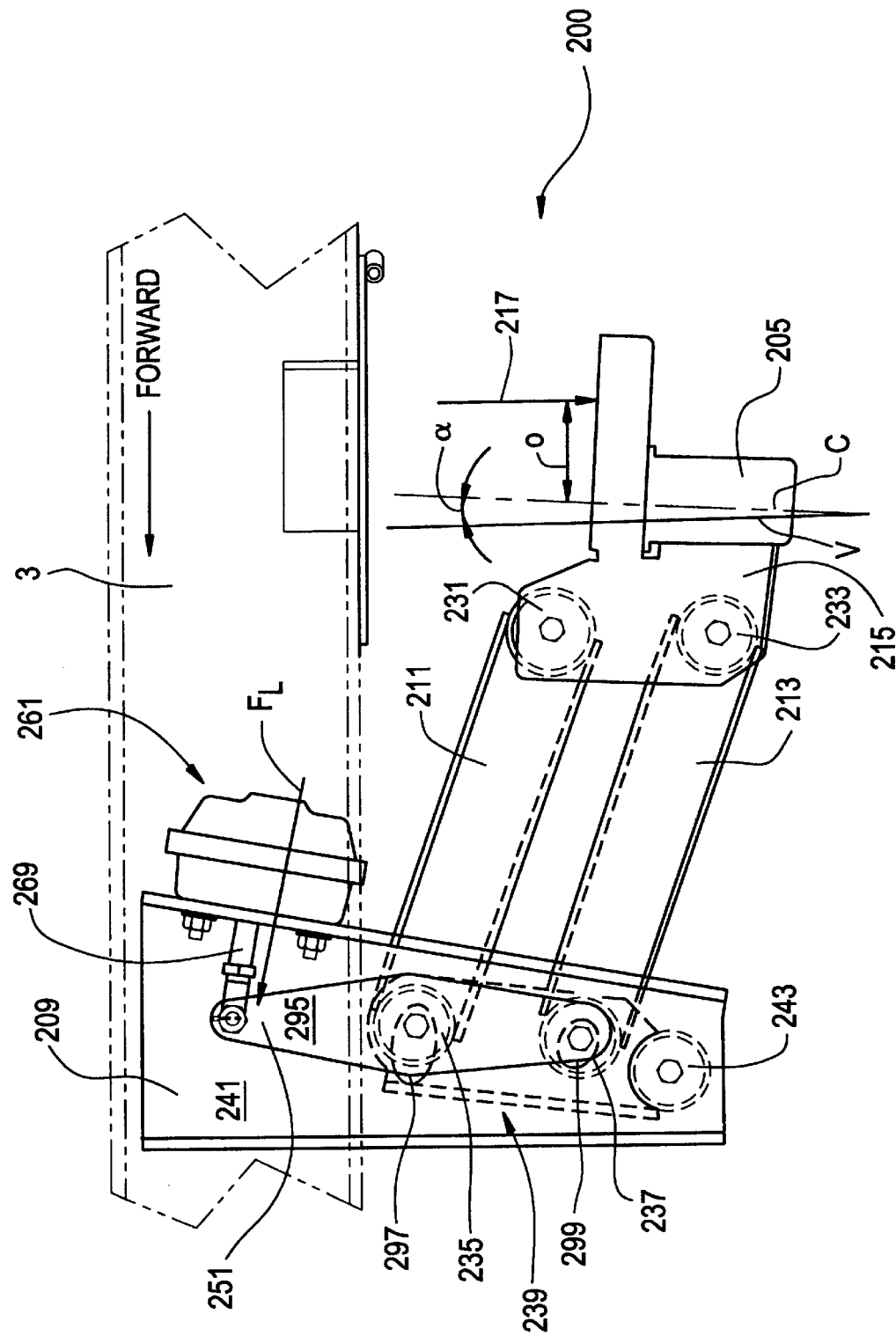
FIG. 7B is a partial, side plan view of the embodiment of FIG. 6 with the axle caster in a forward travel mode.
Figure 8:
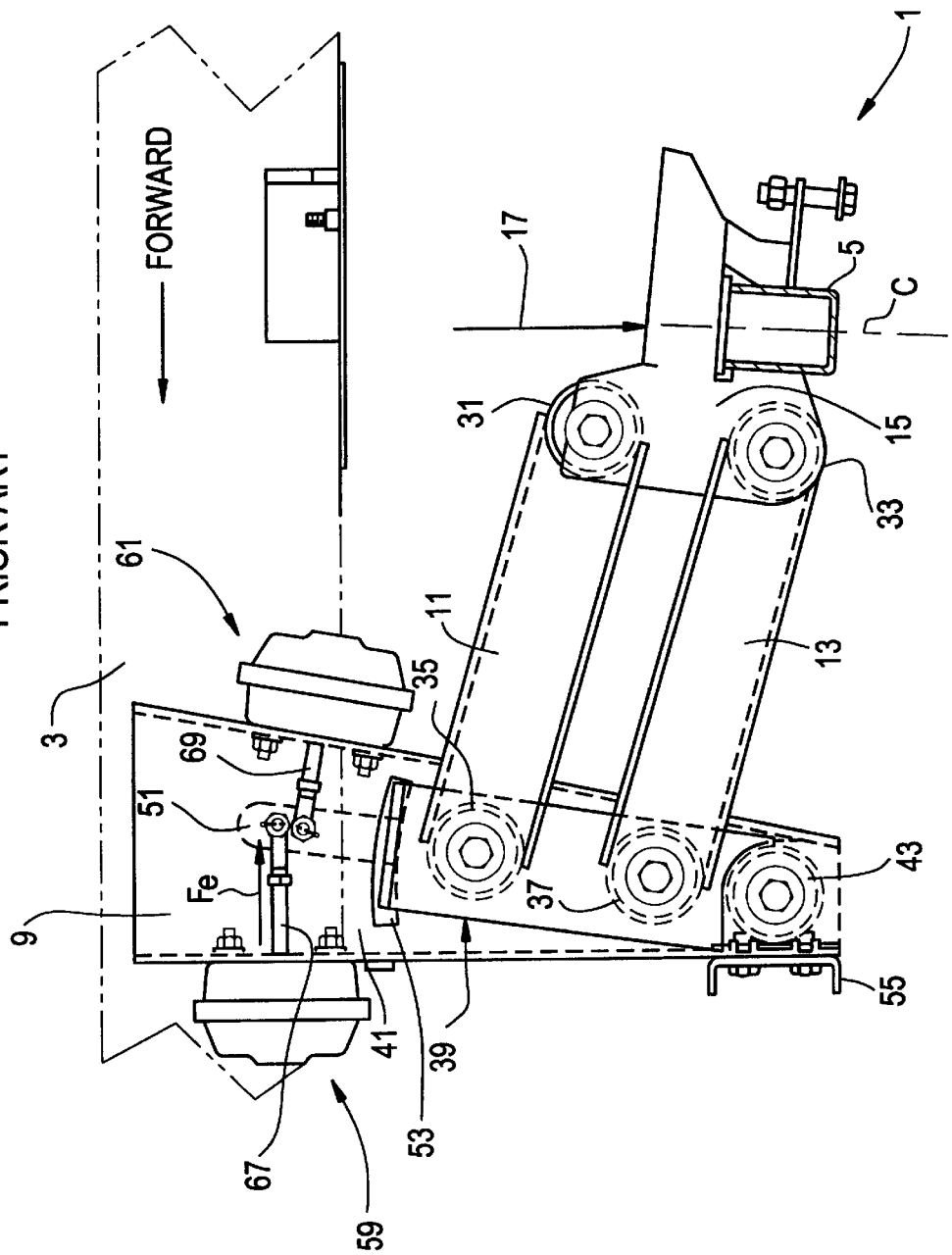
FIG. 8 is a partial, side plan view of the prior art system of FIG. 3 shown with an embodiment of a mechanism for effecting the change of the caster angle.

Referring now to FIGS. 8 and 7B, the prior art system 1 and system 200 of the present invention are shown with exemplar vector force directions (indicated by arrows) in order to highlight the improvements of the efficacy of the subject invention. Air bellows 17 and 217 are not shown but are represented by force arrows 17 and 217 respectively (the direction of each arrow indicating the direction of the respective force). In prior art FIG. 8, a 6000 lb. force (represented by force arrow 17) is shown applied to axle seat 15 at centerline "C" of axle 5. In particular, this force is applied as air bellows 17 is inflated ie. pressurized in a conventional manner. In the prior art '078 system, air bellows 17 is normally inflated to lower axle 5 to engage the wheels (not shown) with the road surface. In order to actually achieve and maintain a caster angle sufficient for a forward roll, however, an additional or extra force of 1100 lbs. must be applied, in a direction and location as indicated by the arrow $F_e$, in order to achieve and maintain a proper (forward steerable) caster angle. As shown in prior art FIG. 8, additional air brake chamber assembly 59 is supplied to provide the needed additional 1100 lb. force which it does by extending rod 67 (connected to arm 51 of cradle 39) as it is pressurized with air. Such an assembly 59 increases the cost and adds significant weight to the system.

Unlike the prior art system 1, the unique and improved system of the present invention, as shown in FIG. 7B, locates the attachment of air bellows 217 at a specific and calculated offset distance "O" relative to centerline "C" of the axle 5. In this example, a 6000 lb. force is shown applied by air bellows 217 (represented by an arrow) 4 inches rearward of centerline "C" of the axle 205 ie. distance "O". Air bellows 217 (e.g. a 13 inch diameter, triple convoluted air spring such as made by Firestone Industrial Products, Model No. 38) would, of course, be so attached such that it would supply this 6000 lb. force at this 4 inch offset location. With this location of attachment, which makes more efficient use of the 6000 lb force applied by air bellow 217, a second air brake chamber (e.g. air brake assembly 59) is not needed. More specifically, the additional 1100 lb force required in the prior art system and supplied by air brake chamber 59 is not needed to achieve and maintain (ie. lock) a caster angle for a forward roll. Quite in contrast, when applying a 6000 lb force as in this example, the 4 inch offset (ie. distance "O") attachment of air bellows 217 actually creates a negative (with respect to forward caster) force of 270 lbs in the caster adjusting mechanism ie. it would take a force greater than 270 lbs applied to arm 251, in a forward direction and location as indicated by force arrow $F_L$, to move pivot assembly 239 and thus axle 205 out of the illustrated (forward-steerable) caster angle, effectively locking the caster angle in place. Therefore, when air bellows 217 is inflated, the forward caster angle is effectively locked in place by this –270 lb force. A rearward caster angle is, of course, locked by activation of air brake chamber 261 to extend rod 269 when a negative caster angle for rearward vehicle movement is effected.

Thus, in the subject invention, when air bellows 217 is attached at an appropriate offset "O" from centerline "C", air bellows 217 is able to supply sufficient force such that it is capable of pivoting pivot assembly 239 (with respect to hanger bracket 209), independently and without the aid of an air brake chamber, to produce and lock in a caster angle appropriate for a forward roll. In this respect, the need for a second air brake chamber e.g. assembly 59 is thereby eliminated. In addition to reducing maintenance, elimination of the need for a second air brake chamber assembly saves space, reduces cost and system weight, and allows for a simplified air control kit.

Thereafter, in order to shift suspension 200 to a caster angle appropriate for a reverse or rearward roll, air brake chamber assembly 261 may thereafter be utilized to provide a force sufficient to overcome the negative 270 lb force created by air bellows 217. This may be done without exhausting air from air bellows 217. In particular, to achieve and lock-in a caster angle appropriate for a rearward roll, air brake chamber assembly 261 is pressurized (by conventional means) in order to cause its rod 269 to extend (against arm 251 of pivot assembly 239) with a force sufficient to overcome the moment generated by air bellows 217 (ie. a force greater than 270 lbs), thereby pivoting pivot assembly 239 about pivot 243 in a forward direction. Air brake chamber assembly 261 must, of course, be sized such that it is capable of both overcoming the negative 270 lb force and achieving and maintaining a caster angle for a reverse roll.

In an alternative embodiment of the subject invention, air bellows 217 may be partially or fully exhausted of air as rod 269 is extended. In particular, this would permit utilizing an air brake chamber assembly 261 of smaller size ie. less force would be needed to overcome that of air bellows 217.

Figure 10:
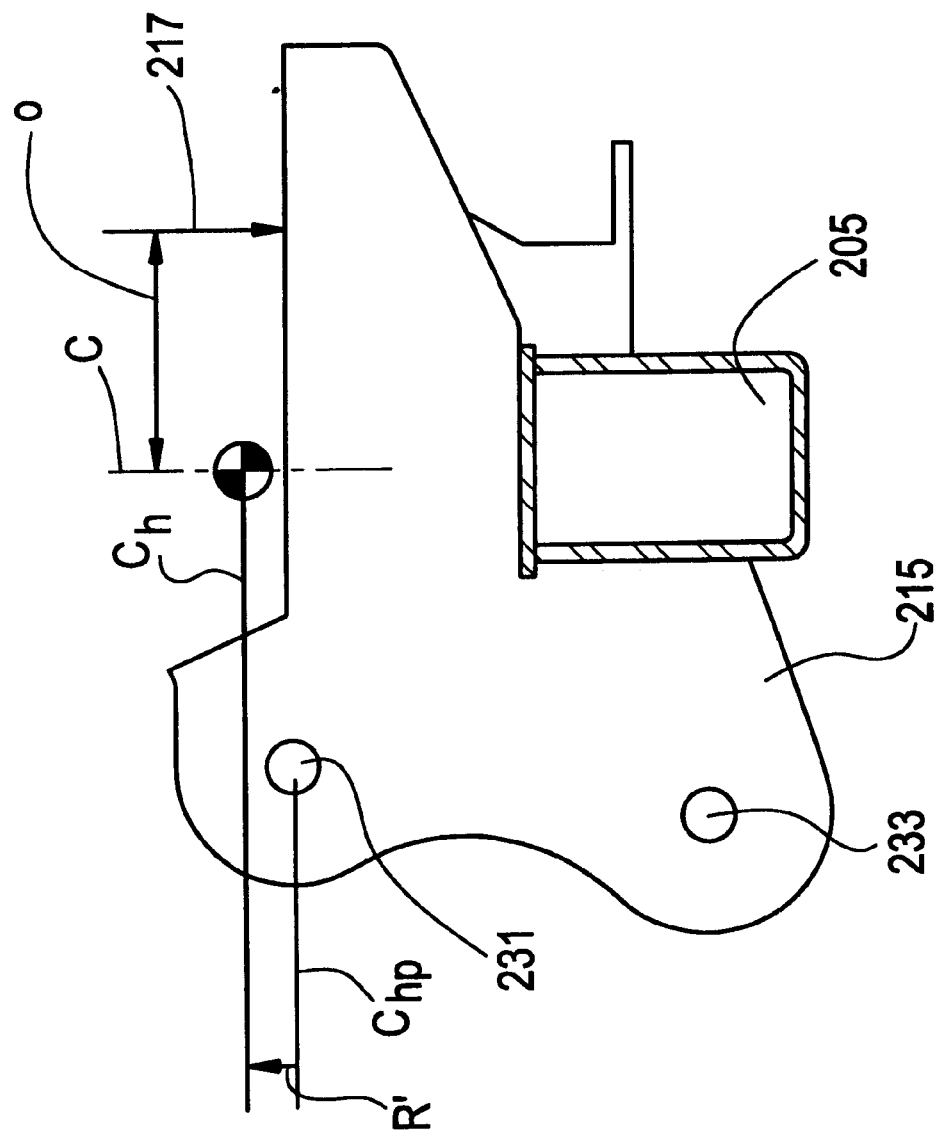
FIG. 10 is a partial, side-plan view of a preferred embodiment of the mechanism of FIG. 5. for effecting the change of the caster angle.

Referring now to FIG. 10, there is illustrated an alternative embodiment of a suspension system according to this invention. In particular, FIG. 10 illustrates axle seat 215 retaining axle 205 shown with the applied force of air bellows 217 (at an offset distance "O") as hereinbefore described in the instant specification. Further illustrated, however, is horizontal centerline $C_h$ of axle 205, shown located at a position near the center of a typical spindle 301 (see FIG. 5) as would be present in such a conventional drop axle. The axle, of course, need not be a drop axle but may be a straight or any other type of conventional axle, each horizontal centerline $C_h$, of course, being located proximal the center of the given spindle. Also illustrated in FIG. 10 is horizontal centerline $C_{hp}$ of pivot 231 (pivot 231 not being illustrated but its location indicated with a lead line). As can be seen in the subject illustration, and demonstrating the improvements of this particular embodiment (which will be described more fully below) horizontal centerline $C_h$ is located at an offset distance "R'" above the plane of horizontal centerline $C_{hp}$.

Figure 11:
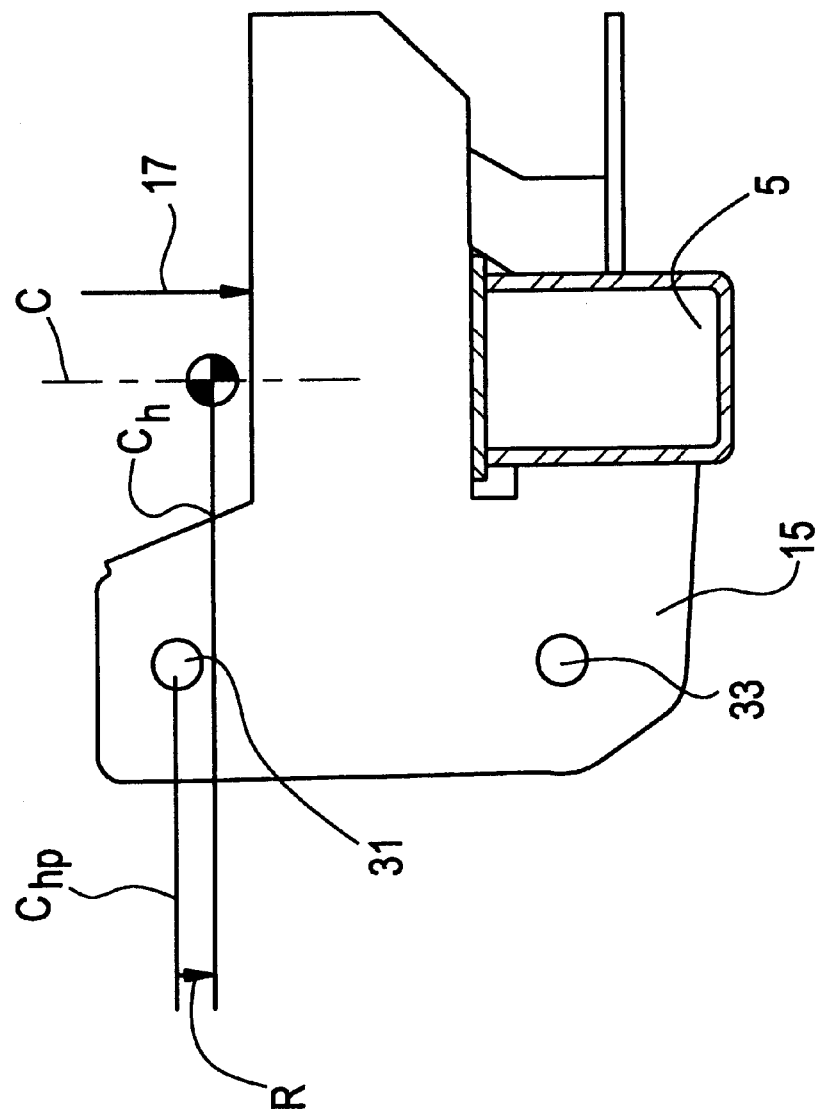
FIG. 11 is a partial, side-plan view of an embodiment of the prior art mechanism of FIG. 3 for effecting the change of the caster angle.

Referring now to prior art FIG. 11, a partial view of prior art suspension 1 is illustrated which serves as a background by which this preferred embodiment (illustrated in FIG. 10) may be easily compared. More specifically, FIG. 11 illustrates the prior art location of horizontal centerline $C_h$ (of axle 5) with respect to the prior art location of horizontal centerline $C_{hp}$ (of pivot 31). As shown in prior art suspension 1, horizontal centerline $C_h$ is located an offset distance "R" below that of horizontal centerline $C_{hp}$. In this arrangement, the force of air bellows 17, although effective, is not optimally utilized, and air bellows 17 is not able to achieve and maintain a caster angle for a forward roll (because air bellows 17 is not sufficiently offset from generally vertical centerline As can be seen from a comparison of FIG. 10 with FIG. 11, a more efficient arrangement (ie. location) of horizontal centerline $C_h$, with respect to horizontal centerline $C_{hp}$ (of pivot 231), is achieved by this embodiment as compared to the system of the prior art. In particular, the embodiment of FIG. 10 more efficiently locates horizontal centerline $C_h$ an offset distance "R'" at a position above that of the horizontal plane of centerline $C_{hp}$. In effect, this arrangement of centerlines (and thus the arrangement of the spindles of axle 205 with respect to pivots 231 and 233) makes more efficient use of the applied force of air bellows 217. More specifically, the greater the distance "R'" (ie. the greater the distance that horizontal centerline $C_h$ is located above that of horizontal centerline $C_{hp}$), the smaller the offset distance "O" need be for a given applied force of air bellows 217 (ie. in order to achieve and lock-in a caster angle for a forward roll). Therefore, in this particular embodiment, the force of air bellows 217 is further optimized by locating horizontal centerline $C_h$ a distance "R'" above that of horizontal centerline $C_{hp}$. This more efficient use of the force supplied by air bellows 217 permits a suspension system of even further reduced packaging size to be produced. Alternatively, of course, rather than decreasing the offset distance "O" ie. the distance of the point of applied force of air bellows 217 from that of the vertical centerline of the axle "C", the size of air bellows 217 may be reduced in order save space or weight, for example.

Figure 9:
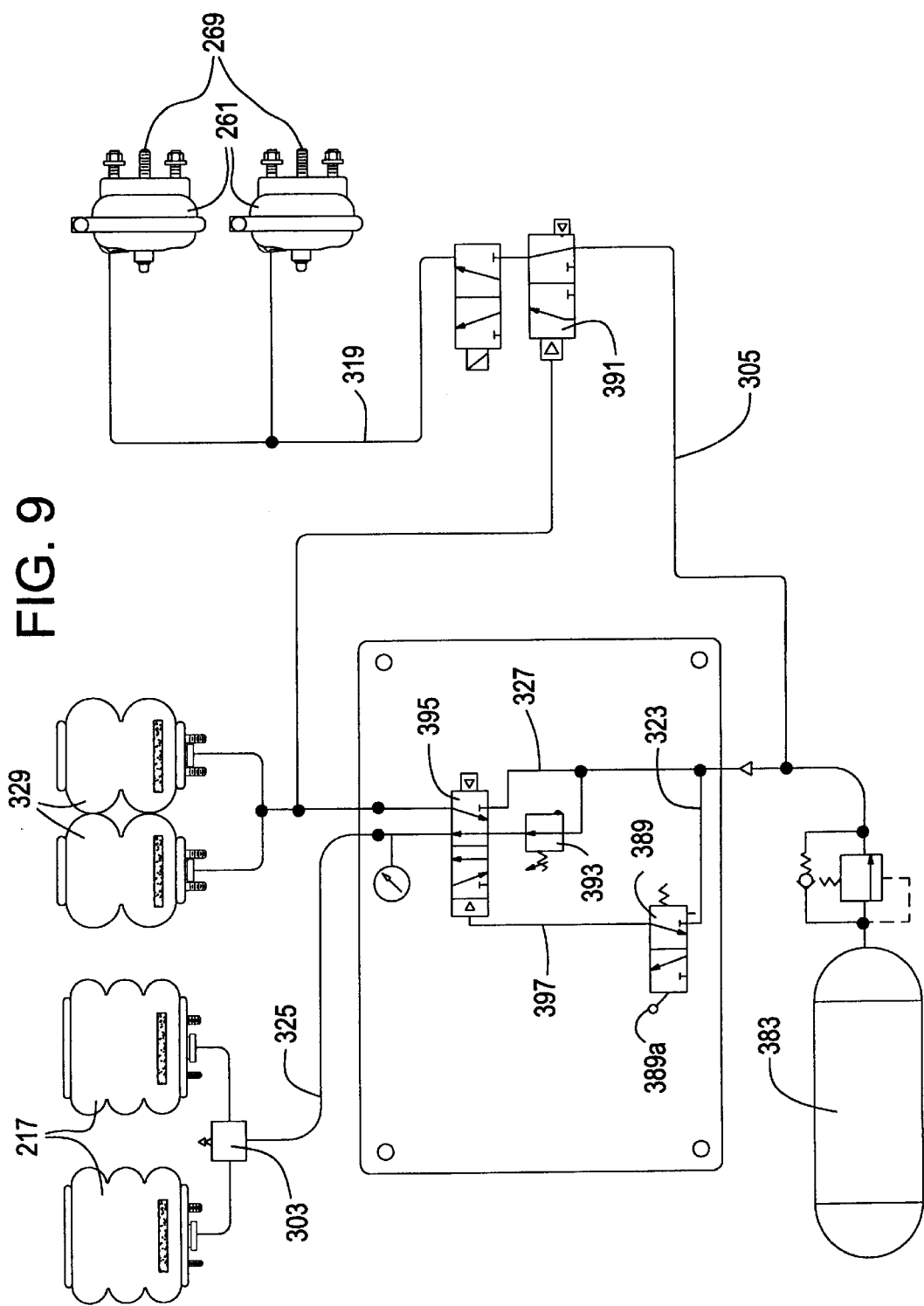
FIG. 9 is a schematic diagram of the operating controls for raising or lowering the axle suspension illustrated in FIG. 5 and/or adjusting the caster of the wheel bearing axle via the mechanism illustrated in FIGS. 6, 7A, and 7B.

Referring now to FIG. 9, an embodiment of the operating controls for adjusting the caster of the subject invention is schematically illustrated. In order to operate the caster adjustment mechanism of the present invention, a conventional air kit and operating controls (including a conventional control panel, solenoids, air lines etc.) similar to those described in the prior art '078 may be used. In particular, and as illustrated in FIG. 9, two-position toggle valve 389 controls the vertical position of axle 205 and includes an operating handle 389a which may be located in the cab of the vehicle for convenience. When toggle valve 389 is shifted (via handle 389a) into the "down" or ride position, no air signal passes through line 397 to activate pilot valve 395, and air pressure enters pressure regulator 393 which thereby directs a flow of air to air bellows 217 (and other, conventional, components) via line 325. Thus, shifting toggle valve 389 into the ride position pressurizes air bellows 217 and causes wheels 111 (see FIG. 1B) to lower into ground engagement. Air pressure is provided, of course, by conventional air supply reservoir 383.

During operation of a loaded vehicle with an auxiliary axle in the "down" position and wheels 111 engaging the road surface, caster angle α is normally adjusted to correspond with either the forward or reverse direction of intended travel. In particular, if a forward steerable caster angle is desired, air bellows 217 are fully pressurized/inflated, while air is simultaneously exhausted from air brake chambers 261 (if pressurized). In the unique and improved caster adjustment mechanism of the present invention, this is the only step necessary to achieve a caster angle appropriate for forward vehicle travel.

When axle 205 is in the down position, pilot valve 391 normally remains open. This allows air to pass to air brake chambers 261 (via line 319) for rearward travel caster angle adjustment when necessary. More specifically, in order to shift axle 205 to an angle appropriate for rearward vehicle travel, air brake chambers 261 need merely be actuated (ie. pressurized) with conventional operational controls. This causes rods 269 to extend, thus shifting axle 205 (by overcoming the force of air bellows 217) into a rearward steerable caster angle. In the current embodiment, when air bellows 217 is fully pressurized, air brake chambers 261 must, of course, provide a force (at the connection of rods 269 to arms 251) substantially greater than 270 lbs (270 lbs being the locking force provided by air bellows 217). In an alternative embodiment, air bellows 217 may be partially exhausted of air (by activating pilot valve 395 and exhausting air through quick release valve 303), which would thus require that less force be output by air brake chambers 261 (to achieve a rearward steerable caster angle).

In order to thereafter lift wheels 111 out of road engagement, handle 389a may be shifted into the "up" position, thus repositioning toggle valve 389. This initiates and maintains wheels 111 in their "lifted" or non-road engaging position. More specifically, in this "up" position, toggle valve 389 passes an air signal from line 323 to line 397 thus activating pilot valve 395. Pilot valve 395 responds, in turn, by exhausting air pressure from line 325 and directing full line pressure from line 327 to conventional lift air-bags 329 and to the pilot port of pilot valve 391. Evacuation of air from line 325 causes quick release valve 303 to exhaust pressure from air bellows 217. With air bellows 217 exhausted and lift air-bags 329 fully pressurized, pilot valve 391 stops air flow in line 305 (if any) and exhausts air from line 319 (if any). Stopping air in line 305 or exhausting air in line 319 is only necessary, of course, if axle 205 was previously positioned at a rearward steerable caster angle (and thus air brake chambers 261 pressurized).

Although the foregoing paragraphs describe a particularly effective and efficient set of operating controls, these controls need not be used to practice within the scope of the subject invention. To the contrary, any conventional means may be used as operating controls for the subject caster adjustable suspension system.

Once given the above disclosure many other features, modifications and improvements will become apparent to the skilled artisan. Such other features, modifications and improvements are therefore considered to be a part of this invention, the scope of which is to be determined by the following claims:

We claim:

1. In a steerable axle suspension system for a wheeled vehicle having a frame member, said suspension system including a wheel bearing axle having a generally vertical centerline and at least one ground engaging wheel at each end thereof, said suspension system being attachable to said frame member and when so attached defining a caster angle for said axle with respect to the travel surface of said vehicle, said suspension system further including a hanger bracket for connecting said suspension system to said frame member, an axle seat for retaining said axle in said system, a first and a second beam member extending between said axle seat and said hanger bracket, and a mechanism for adjusting the caster angle of said axle;

wherein the improvement comprises as said mechanism for adjusting said caster angle of said axle:

a pivot assembly pivotally attached to said hanger bracket;

a first pivot attached to said pivot assembly and having an end of said first beam member attached thereto, the other end of said first beam member being pivotally attached to said axle seat;

a second pivot attached to said pivot assembly and having an end of said second beam member attached thereto, the other end of said second beam member being pivotally attached to said axle seat;

a third pivot attached to said pivot assembly and to said hanger bracket such that said pivot assembly is pivotable with respect to said hanger bracket about said third pivot;

wherein said first, second and third pivots are so located one with respect to the other such that when said pivot assembly is pivoted about said third pivot with respect to said hanger bracket, said caster angle of said axle is changed; and wherein said mechanism for adjusting said caster angle of said axle further includes a mechanism for pivoting said pivot assembly about said third pivot comprising:

an air bellows so located with respect to said centerline of said axle such that when said air bellows is expanded or contracted said pivot assembly is pivoted about said third pivot thereby to change said caster angle to a desired angle; and wherein said air bellows is of a sufficient capacity and is sufficiently offset from said centerline of said axle such that, when inflated, said air bellows maintains said angle of caster at said desired angle during vehicle travel.

2. The steerable axle suspension system of claim 1 further including:

an air brake chamber assembly having an extendible and retractable rod attachable to said pivot assembly, said air brake chamber assembly being capable of pivoting said pivot assembly in a direction about said third pivot, opposite that of the direction of pivot produced by said air bellows, thereby being capable of changing the caster angle of said axle and further being capable of thereafter maintaining the angle of caster.

3. A mechanism for adjusting the caster angle of the wheels of at least one axle in a steerable axle suspension system of a multi-axle wheeled vehicle, said mechanism including:

a hanger bracket for connecting said suspension system to a vehicle frame member;

an axle seat for retaining an axle in said suspension system, said axle having a generally vertical centerline;

a first and second beam member each pivotally connected at one of their ends to said axle seat and at their opposite ends to a pivot assembly thereby to define a first and second pivot in said pivot assembly;

a third pivot located between said hanger bracket and said pivot assembly and pivotally connecting said pivot assembly to said hanger bracket;

said first, second, and third pivots being so located with respect to each other such that when said pivot assembly is pivoted about said third pivot with respect to said hanger bracket, the caster angle of any wheeled axle connected to said axle seat will change; and a mechanism for pivoting said pivot assembly about said third pivot with respect to said hanger bracket including:

an air bellows so located at an offset with respect to said centerline of said axle, such that said air bellows is capable of pivoting said axle to a caster angle appropriate for a direction of travel of said wheeled vehicle, and is capable of thereafter maintaining the angle of caster.

4. The mechanism for adjusting the caster angle in a steerable axle suspension system of claim 3 further including:

an air brake chamber assembly having an extendible and retractable rod attachable to said pivot assembly, said air brake chamber assembly being capable of pivoting said pivot assembly in a direction about said third pivot, opposite that of the direction of pivot produced by said air bellows, thereby being capable of changing the caster angle of said axle and further being capable of thereafter maintaining the angle of caster.

5. The steerable axle suspension system of claim 2 wherein said air bellows is connected to said axle seat at a location offset from said centerline of said axle, thereby to increase the moment generated about said third pivot when said air bellows is pressurized, said moment generated being sufficient to achieve and maintain a caster angle appropriate for forward vehicle travel.

6. The mechanism for adjusting the caster angle in a steerable axle suspension system of claim 4 wherein said air bellows is connected to said axle seat at a location offset from said centerline of said axle, thereby to increase the moment generated about said third pivot when said air bellows is pressurized, said moment generated being sufficient to achieve and maintain a caster angle appropriate for forward vehicle travel.

7. The steerable axle suspension system of claim 5 wherein said air brake chamber assembly is so sized so as to be capable of overcoming the moment of said air bellows in order to achieve and lock-in a caster angle appropriate for reverse vehicle travel.

8. The mechanism for adjusting the caster angle in a steerable axle suspension system of claim 6 wherein said air brake chamber assembly is so sized so as to be capable of overcoming the moment of said air bellows in order to achieve and lock-in a caster angle appropriate for reverse vehicle travel.

9. The steerable axle suspension system of claim 5 wherein said offset connection location is at least 4 inches from said centerline of said axle.

10. The mechanism for adjusting the caster angle in a steerable axle suspension system of claim 6 wherein said offset connection location is at least 4 inches from said centerline of said axle.

11. The steerable axle suspension system of claim 7 wherein said air bellows is located between said axle and said frame of said vehicle thereby to carry a portion of the load of the vehicle.

12. The mechanism for adjusting the caster angle in a steerable axle suspension system of claim 8 wherein said air bellows is located between said axle and said frame of said vehicle thereby to carry a portion of the load of said vehicle.

13. The steerable axle suspension system of claim 7 wherein said suspension system is a lift axle suspension system capable of raising the wheels from and lowering the wheels into road engagement.

14. The mechanism for adjusting the caster angle in a steerable axle suspension system of claim 8 wherein said suspension system is a lift axle suspension system capable of raising the wheels from and lowering the wheels into road engagement.

15. The steerable axle suspension system of claim 7 wherein said suspension system includes a mechanism for lifting and lowering an axle of said suspension system said mechanism comprising an inflatable and deflatable air bellows located proximal said first and second beam members and intermediate their ends.

16. The mechanism for adjusting the caster angle in a steerable axle suspension system of claim 8 wherein said suspension system includes a mechanism for lifting and lowering said axle of said suspension system said mechanism comprising an inflatable and deflatable air bellows located proximal said first and second beam members and intermediate their ends.

17. A vehicle having at least one primary means of support and employing the suspension system of claim 1.

18. The steerable axle suspension system of claim 1 further including a fourth pivot whereby said first beam member is attached to said axle seat, said fourth pivot having a horizontal centerline $C_{hp}$;

said axle having a horizontal centerline $C_h$ located proximal the horizontal plane of a spindle provided on said axle;

wherein said horizontal centerline $C_h$ is so located with respect to said horizontal centerline $C_{hp}$, at an offset distance "R'" above said horizontal centerline $C_{hp}$, such that the moment generated about said third pivot by said air bellows is thereby increased.

19. The steerable axle suspension system of claim 18 wherein said air bellows is located at an offset distance "O" with respect to said generally vertical centerline C of said axle, such that when said offset distance "R'" is increased, said offset distance "O" may be decreased.

* * * * *

UNITED STATES PATENT AND TRADEMARK OFFICE
CERTIFICATE OF CORRECTION

PATENT NO.     : 6,293,570 B1
DATED          : September 25, 2001
INVENTOR(S)    : Gottschalk et al.

It is certified that error appears in the above-identified patent and that said Letters Patent is hereby corrected as shown below:

Column 3,
Line 58, after "6,007,078" delete ".".

Column 4,
Line 43, after "connection", insert -- to --.

Column 6,
Line 14, delete "invent-ion", and insert -- invention --.

Column 7,
Line 34, delete "o", and insert -- O --.
Line 51, delete "o", and insert -- O --.

Column 9,
Line 53, after "centerline", insert -- C. --.

Signed and Sealed this

Thirtieth Day of April, 2002

*Attest:*

JAMES E. ROGAN
*Attesting Officer*           *Director of the United States Patent and Trademark Office*